US009864386B2

(12) United States Patent
Kurnaz et al.

(10) Patent No.: US 9,864,386 B2
(45) Date of Patent: Jan. 9, 2018

(54) OVERVOLTAGE CLAMP IN REGULATORS

(71) Applicant: Dialog Semiconductor (UK) Limited, London (GB)

(72) Inventors: Hande Kurnaz, Dettingen-Teck (DE); Ambreesh Bhattad, Swindon (GB); Frank Kronmueller, Neudenau (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/090,716

(22) Filed: Apr. 5, 2016

(65) Prior Publication Data
US 2017/0068264 A1    Mar. 9, 2017

(30) Foreign Application Priority Data
Sep. 3, 2015    (DE) .......................... 10 2015 216 928

(51) Int. Cl.
| G05F 1/571 | (2006.01) |
| G05F 1/56 | (2006.01) |
| G05F 1/569 | (2006.01) |
| G05F 1/575 | (2006.01) |
| H02M 1/32 | (2007.01) |

(52) U.S. Cl.
CPC .............. *G05F 1/571* (2013.01); *G05F 1/562* (2013.01); *G05F 1/569* (2013.01); *G05F 1/575* (2013.01); *H02M 1/32* (2013.01)

(58) Field of Classification Search
CPC .. H02M 1/32; G05F 1/56; G05F 1/562; G05F 1/569; G05F 1/571; G05F 1/575
See application file for complete search history.

(56) References Cited

U.S. PATENT DOCUMENTS

| 2007/0053115 A1* | 3/2007 | Tain ........................ G05F 1/575 361/18 |
| 2008/0180071 A1* | 7/2008 | Moraveji .................. H03K 5/08 323/268 |
| 2009/0273331 A1* | 11/2009 | Inoue ....................... G05F 1/575 323/312 |
| 2010/0156362 A1 | 6/2010 | Xie |
| 2013/0113447 A1* | 5/2013 | Kadanka .................... G05F 1/56 323/280 |

(Continued)

FOREIGN PATENT DOCUMENTS

DE    10 2015 216 928.6    1/2015

*Primary Examiner* — Fred E Finch, III
(74) *Attorney, Agent, or Firm* — Saile Ackerman LLC; Stephen B. Ackerman

(57) ABSTRACT

A regulator for providing a load current at a regulator output voltage to a load at an output of the regulator is described. The regulator has a differential input stage to provide a differential output voltage based on a reference voltage and based on the regulator output voltage. Furthermore, the regulator has an output driver to generate a control signal based on the differential output voltage. In addition, the regulator has a pass transistor to provide the load current in dependence of the control signal. The regulator also has clamping circuitry to sense an overvoltage indication which indicates that the pass transistor is being turned off. Furthermore, the clamping circuitry clamps the differential output voltage to a clamping voltage, if the overvoltage indication indicates that the pass transistor is being turned off.

27 Claims, 5 Drawing Sheets

(56) References Cited

U.S. PATENT DOCUMENTS

2014/0354249 A1* 12/2014 Kurozo .................. G05F 1/575
  323/271
2014/0375289 A1   12/2014 Kronmueller et al.
2015/0229124 A1*  8/2015 Kim ........................ G05F 1/571
  361/86
2015/0346750 A1* 12/2015 Bhattad .................. G05F 1/575
  323/280

* cited by examiner

OVERVOLTAGE CLAMP IN REGULATORS

TECHNICAL FIELD

The present document relates to regulators, notably to low-dropout (LDO) regulators. In particular, the present document relates to regulators having a fast recovery subject to an overvoltage condition.

BACKGROUND

In LDOs, notably in LDOs employing a relatively high gain multi-stage amplifier as an error amplifier and using Miller compensation, relatively slow recovery from an overvoltage condition may occur due to operating point disturbance after a load transient or after any other excitation causing feedback voltage deviation from normal operation. If the LDO is disturbed prior to full recovery of the internal nodes of the LDO (e.g. by a load current request), relatively high voltage dips may be observed at its output, because the LDO is out of regulation. This may lead to reduced regulator output voltage levels at the output of the LDO and may cause resets in the circuitry which is supplied by the LDO.

Such situations may occur e.g. for pulse train like load currents which periodically toggle between a relatively high load current IMAX and a relatively low load current or no load current. In particular, such situations may occur if the time interval between a request for a relatively high load current and a request for a relatively low load current is shorter than the time which is needed for the LDO's internal nodes to recover to their target operation points after an overvoltage condition.

SUMMARY

The present document addresses the technical problem of providing a regulator circuit which exhibits a fast and stable recovery subject to an overvoltage condition.

According to an aspect, a regulator is described. The regulator is used for providing a load current at a regulator output voltage to a load at an output of the regulator. Typically, the regulator is configured to regulate the regulator output voltage in accordance to a pre-determined reference voltage, which is set at an input of a differential input stage of the regulator. In particular, the regulator may comprise a low-drop out (LDO) regulator.

The regulator comprises a differential input stage which is configured to provide a differential output voltage based on a reference voltage and based on the regulator output voltage. In particular, the differential input stage may be configured to provide the differential output voltage based on a difference between the reference voltage and a feedback voltage which is derived from the regulator output voltage. The feedback voltage may be derived from the regulator output voltage using a voltage divider. As such, the feedback voltage may be proportional to the regulator output voltage, wherein the proportionality factor may be defined by the resistor ratio of the voltage divider.

Furthermore, the regulator comprises an output driver which is configured to generate a control signal (e.g. a gate signal) based on the differential output voltage. In addition, the regulator comprises a pass transistor which is configured to provide the load current in dependence of the control signal. The pass transistor typically comprises a gate and the control signal may be applied to the gate of the pass transistor. In particular, the pass transistor may be a metal oxide semiconductor (MOS) transistor, notably a p-type MOS transistor. By changing a voltage level of the control signal, the load current through the pass device may be modified, i.e. the pass transistor may be turned on or off. In case of a p-type MOS transistor, increasing the control signal typically leads to a reduction of the load current and decreasing the control signal typically leads to an increase of the load current.

The regulator further comprises clamping circuitry which is configured to sense an overvoltage indication which indicates that the pass transistor is being turned off. The overvoltage indication may be sensed by sensing the control signal which is applied to the pass transistor, thereby providing a fast indication of whether the pass transistor is being turned off. If it is determined that the regulator is turning off the pass transistor (completely), this typically means that the requested load current has dropped significantly so that the load current charges an output (notably an output capacitor) of the regulator, thereby increasing the regulator output voltage above a desired level (which is indicated by the reference voltage). Hence, the fact that the pass transistor is being turned off (completely) is typically in indication of an overload situation at the output of the regulator.

The clamping circuitry is further configured to clamp the differential output voltage (at the output of the differential input stage) to a clamping voltage, if the overvoltage indication indicates that the pass transistor is being turned off. By clamping the differential output voltage to a clamping voltage, an overshoot of the differential output voltage and a corresponding overshoot of the control signal may be avoided, thereby avoiding a complete turn-off of the pass transistor. In particular, it may be achieved by clamping of the differential output voltage that the regulator and in particular the different stages of the regulator are maintained relatively close to their normal operation points. As a result of this, a fast and stable recovery subject to an overvoltage condition may be achieved.

Typically, the differential output voltage should be close to zero (thereby indicating that the feedback voltage corresponds to the reference voltage). As such, the clamping voltage may be relatively close to zero. By way of example, the clamping voltage may depend on or may correspond to the voltage drop of a forward-biased (MOS) diode.

The clamping circuitry may be configured to sense the overvoltage indication by determining a mirrored version of the control signal. By doing this, the overvoltage indication may be determined in a precise and timely manner, thereby ensuring a fast reaction of the clamping circuitry to an overvoltage condition.

The pass transistor may be coupled to an input voltage (also referred to as a supply voltage). The output driver may comprise an auxiliary transistor (notably a p-type MOS transistor) and a lower driver transistor (notably an n-type MOS transistor), which are arranged in series between the input voltage and ground. The control signal may be provided at a midpoint between the auxiliary transistor and the lower driver transistor, wherein this midpoint may be referred to as a control midpoint. A voltage which is applied to a gate of the lower driver transistor may depend on the differential output voltage. As such, the output driver may generate the control signal based on the differential output voltage.

The output driver may further comprise an upper driver transistor (notably a p-type MOS transistor), wherein a source of the upper driver transistor may be coupled to the input voltage and wherein a drain and a gate of the upper driver transistor may be coupled to the control midpoint. Furthermore, the regulator may comprise a bias current source which is configured to provide a bias current and a bias transistor (e.g. a p-type MOS transistor) which is arranged in series with the bias current source between the input voltage and ground. The auxiliary transistor and the bias transistor may form a current mirror. The combined use of an auxiliary transistor and an upper driver transistor may be beneficial for setting an operation point of the pass transistor.

The clamping circuitry may comprise an upper sensing transistor (notably a p-type MOS transistor) and a lower sensing transistor (notably an n-type MOS transistor) which are arranged in series between the input voltage and ground. Gates of the lower driver transistor and the lower sensing transistor may be coupled to one another. Furthermore, gates of the auxiliary transistor and the upper sensing transistor may be coupled to one another. As such, a (scaled) version of the output driver may be provided for sensing the overvoltage indication. By doing this, the overvoltage indication may be provided at a midpoint between the upper sensing transistor and the lower sensing transistor. The overvoltage indication thereby corresponds to a (scaled) version of the drive signal, thereby providing a precise and immediate indication on whether the pass transistor is being turned off.

A size (notably a width-to-length ratio) of the upper sensing transistor may be greater than a size of the auxiliary transistor. Furthermore, a size (notably a width-to-length ratio) of the lower sensing transistor may be equal to the size of the lower driver transistor. By selecting the upper sensing transistor to be greater than the auxiliary transistor, it may be ensured that the overvoltage indication is set prior to a full turn-off of the pass transistor, thereby ensuring an early activation of clamping and thereby enabling a fast recovery subject to an overvoltage condition.

Alternatively or in addition, the clamping circuitry may comprise a comparator transistor (notably a p-type MOS transistor) and a reference current source, wherein the reference current source is configured to provide a reference current. The reference current may be tuned to define the control signal at which the overvoltage indication is set (to indicate that the pass transistor is being turned off). The comparator transistor and the reference current source are arranged in series between the control midpoint and ground. A gate of the comparator transistor is coupled to an offset version of the input voltage. The offset version of the input voltage may be generated using one or more diodes, which are arranged in a forward biased manner between the input voltage and the gate of the comparator transistor. The overvoltage indication may be provided at a midpoint between the comparator transistor and the reference current source.

The clamping circuitry may comprise a clamping diode which is set or arranged to couple an output of the differential input stage to ground, if the overvoltage indication indicates that the pass transistor is being turned off. The clamping voltage may then depend on or may correspond to a diode voltage drop at the clamping diode. As such, it may be ensured that the differential output voltage stays close to its normal operation point (even in case of an overvoltage condition).

The overvoltage indication may take on a low level and a high level. A high level may indicate that the pass transistor is being turned off. On the other hand, a low level may indicate that no clamping of the differential output voltage should occur (such that the regulation loop of the regulator is not disturbed).

The clamping diode may comprise a clamping transistor (notably an n-type MOS transistor). A gate of the clamping transistor may be coupled to the output of the differential input stage, and a source of the clamping transistor may be coupled to ground. The clamping circuitry may be configured to couple or decouple a drain of the clamping transistor to or from the gate of the clamping transistor in dependence of the level of the overvoltage indication. By doing this, the clamping to the clamping voltage may be activated or deactivate in an efficient manner. The clamping voltage depends on or corresponds to the gate-source voltage of the clamping transistor in this case.

The clamping circuitry may comprise a first transistor (notably an n-type MOS transistor) and a second transistor (notably an n-type MOS transistor). A drain of the first transistor may be coupled to a node at which the overvoltage indication is provided (e.g. to the midpoint between the upper sensing transistor and the lower sensing transistor, or to the midpoint between the comparator transistor and the reference current source). A drain of the second transistor may be coupled to the output of the differential input stage. Furthermore, gates of the first transistor and the second transistor may be coupled to one another. The gate of the first transistor may be coupled to the drain of the first transistor, a source of the first transistor may be coupled to ground, and a source of the second transistor may be coupled to the drain of the clamping transistor. As such, clamping may be activated or deactivate in an efficient and precise manner.

The regulator typically comprises an intermediate amplification stage which is coupled to an output of the differential input stage and which is configured to generate an intermediate voltage based on the differential output voltage. The output driver may be configured to generate the control signal based on the intermediate voltage.

According to a further aspect, a method for providing a load current at a regulator output voltage to a load is described. The method comprises providing a differential output voltage based on a difference between a reference voltage and a feedback voltage, wherein the feedback voltage is derived from the regulator output voltage. Furthermore, the method comprises generating a control signal based on the differential output voltage, and providing the load current in dependence of the control signal using a pass transistor. In addition, the method comprises sensing an overvoltage indication which indicates that the pass transistor is being turned off, and clamping the differential output voltage to a clamping voltage, if the overvoltage indication indicates that the pass transistor is being turned off.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As outlined above, voltage regulators may exhibit relatively long recovery times subject to an overvoltage condition. The present document is directed at the technical problem of reducing the recovery times of such regulators subject to an overvoltage condition.

Figure 1A:
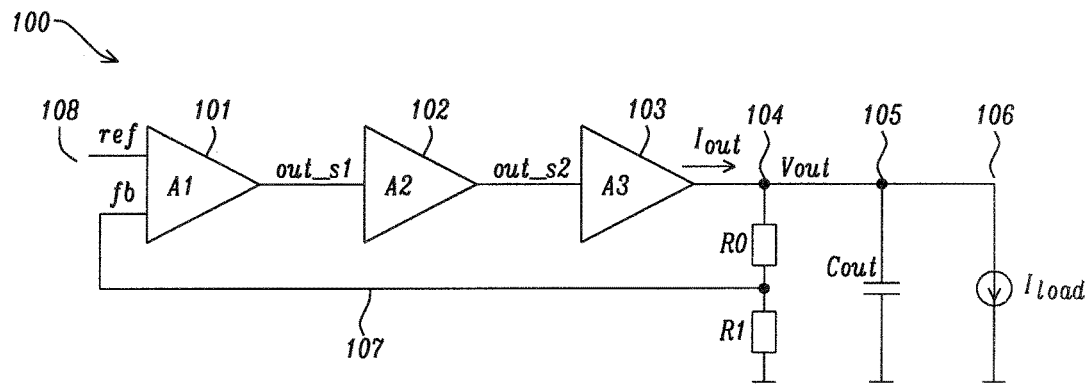
FIG. 1a illustrates an example block diagram of an LDO regulator.

A typical LDO regulator 100 is illustrated in FIG. 1a. The LDO regulator 100 comprises an output amplification stage 103 at the output and a differential amplification stage or differential input stage 101 (also referred to as error amplifier) at the input. A first input (fb) 107 of the differential input stage 101 receives a fraction of the output voltage $V_{out}$ determined by the voltage divider 104 comprising resistors R0 and R1. The second input (ref) to the differential input stage 101 is a stable voltage reference $V_{ref}$ 108 (also referred to as the bandgap reference or reference voltage). If the regulator output voltage $V_{out}$ changes relative to the reference voltage $V_{ref}$, the drive voltage (also referred to as gate signal) to the pass transistor of the output amplification stage changes by a feedback mechanism called the main feedback loop to maintain a constant regulator output voltage $V_{out}$.

The LDO regulator 100 of FIG. 1a further comprises an additional intermediate amplification stage 102 configured to amplify the differential output voltage of the differential input stage 101. As such, an intermediate amplification stage 102 may be used to provide an additional gain within the amplification path. Furthermore, the intermediate amplification stage 102 may provide a phase inversion.

In addition, the LDO regulator 100 may comprise an output capacitance $C_{out}$ (also referred to as output capacitor or stabilization capacitor or bypass capacitor) 105 parallel to the load 106. The output capacitor 105 is used to stabilize the regulator output voltage $V_{out}$ subject to a change of the load 106, in particular subject to a change of the load current $I_{load}$.

Figure 1B:
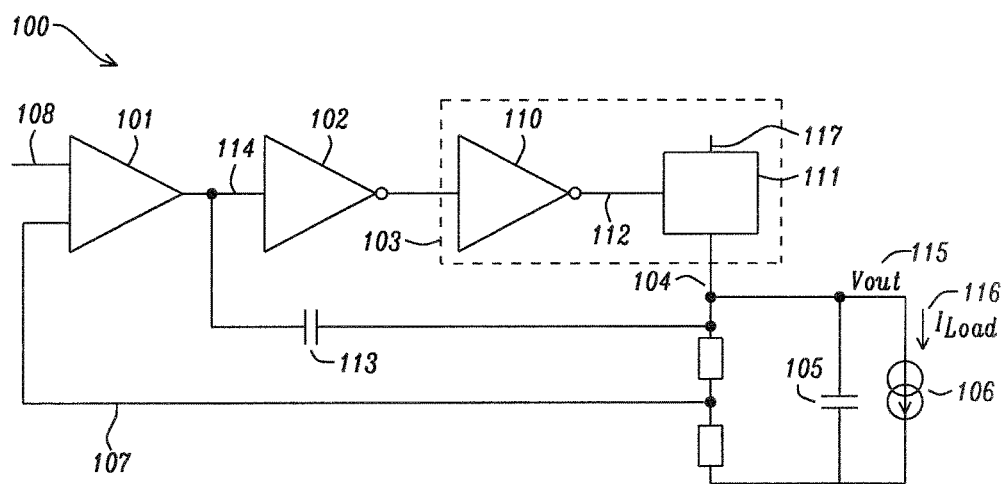
FIG. 1b illustrates an example block diagram of an LDO regulator with Miller compensation.

FIG. 1b shows further details of an LDO regulator 100. The output stage 103 typically comprises a pass transistor 111 which is configured to provide the load current 116 at the regulator output voltage 115 to the load 106. The pass transistor 111 is coupled to the input voltage or supply voltage 117. The pass transistor 111 is controlled via a control signal (e.g. a gate signal or gate voltage) 112, wherein the control signal is generated by an output driver 110.

The LDO regulator 100 of FIG. 1b further comprises a Miller capacitor 113 which provides a feedback from the output (i.e. the drain) of the pass transistor 111 to the output of the differential input stage 101. Feedback is provided via the Miller capacitor 113 notably when changes occur to the regulator output voltage 115, thereby affecting the differential output voltage 114 of the differential input stage 101.

Figure 1C:
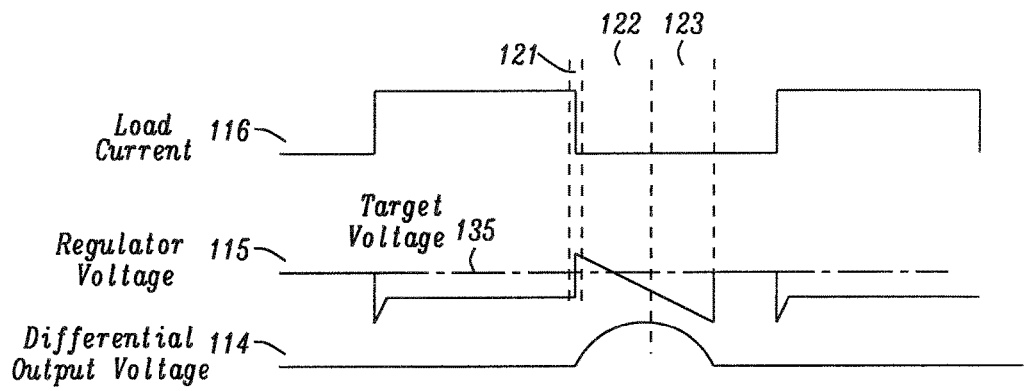
FIG. 1c shows example measurement signals at an LDO regulator.

FIG. 1c shows example measurement signals at the LDO regulator 100 of FIG. 1b subject to an overvoltage condition. In particular, FIG. 1c shows an example curve of the load current 116, of the regulator output voltage 115 and of the differential output voltage 114. It can be seen that subject to an increase of the load current, the regulator output voltage 115 may exhibit a relatively small dip below the target voltage 135 (which depends on the reference voltage 108). Furthermore, it can be seen that subject to a reduction of the load current 116 (during the time interval 121), the regulator output voltage 115 exhibits a peak. Such a situation may be referred to as an overvoltage condition.

As can be observed from FIG. 1c, the differential output voltage 114 starts increasing after load removal. This is typically due to the relatively low bandwidth of the LDO regulator 100. It takes a certain time interval 121 until the current through the pass transistor 111 changes from IMAX to 0 and during this time interval 121, the output capacitor 105 is charged with the current through the pass transistor 111. This leads to the increase of the regulator output voltage 115. Because the regulator output voltage 115 is above the target voltage 135, the differential output voltage 114 is above zero during the time intervals 121 and 122. This results in a decreased $2^{nd}$ stage output voltage (referred to as the intermediate voltage) and in an increased $3^{rd}$ stage output (i.e. to an increase regulator output voltage 115) during the time interval 122. The outputs of the $2^{nd}/3^{rd}$ stage may decrease/increase until the outputs are saturated at ground respective at the supply voltage 117, unless another excitation arrives. The regulator output voltage 115 of the LDO regulator 100 decreases during the time interval 122 since the pass transistor 111 is completely off and since the load current (notably the current through the resistor divider 104) slowly discharges the output capacitor 105.

The differential output voltage 114 typically exhibits a relatively slow slewing due to a relatively low current capability of the differential input stage 101 and due to a relatively large Miller capacitor 113. Once the load 106 is totally removed, the only discharge path for the output capacitor 105 during the time intervals 122, 123 is via the resistor divider 104. At the end of the time interval 122, the regulator output voltage 115 reaches the target voltage 135, thereby causing the differential output voltage 114 to be discharged. This may be considered to be the end of the overvoltage condition. However, due to the relatively low current capability of the differential input stage 101 and due to a relatively large Miller capacitor 113, the discharge of the differential output voltage 114 may require a relatively long time interval 123. The $2^{nd}$ stage and $3^{rd}$ stage outputs are typically still clamped at minimum/maximum at the end of the time interval 122.

If there occurs another load request prior to the end of the time interval 123, all internal nodes of the LDO regulator 101 are typically still relatively far away from their operating points. In particular, the pass transistor 111 is completely off. As a result of this, a load current 116 which is requested from the LDO regulator 100 can only be provided from the output capacitor 105, resulting in a relatively large dip of the regulator output voltage 115 until at time instant at which the pass transistor 111 goes back into its original operating point.

Such a situation may be avoided by preventing the differential output voltage 114 to substantially increase subject to an overvoltage condition. An increase of the differential output voltage 114 may be prevented by clamping the output node of the differential input stage 101 to a voltage which is only slightly higher (e.g. 5-10% or ~10 mV higher) than the closed loop regulated operating voltage of this output node.

Figure 2:
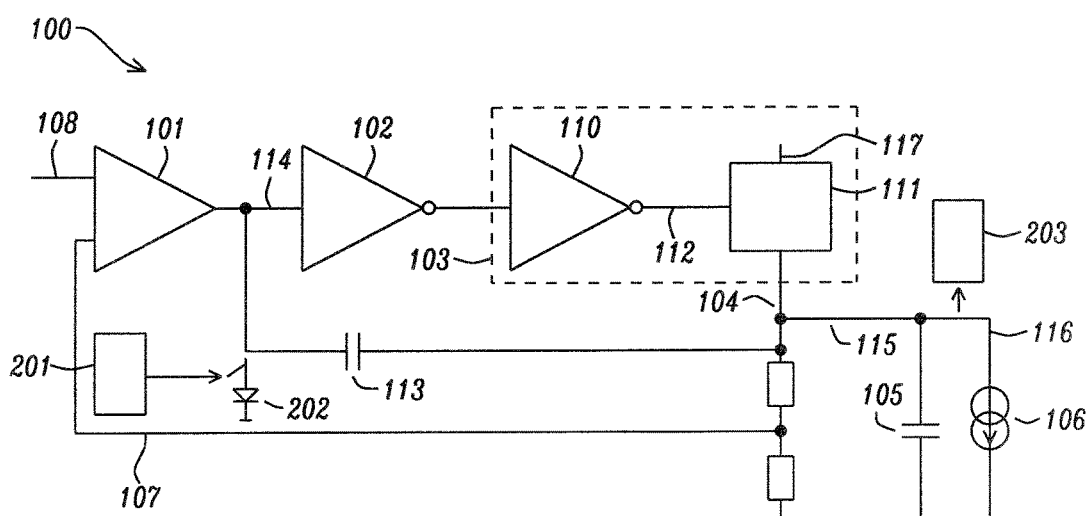
FIG. 2 shows a block diagram of an example LDO regulator with clamping circuitry.
Figure 3:
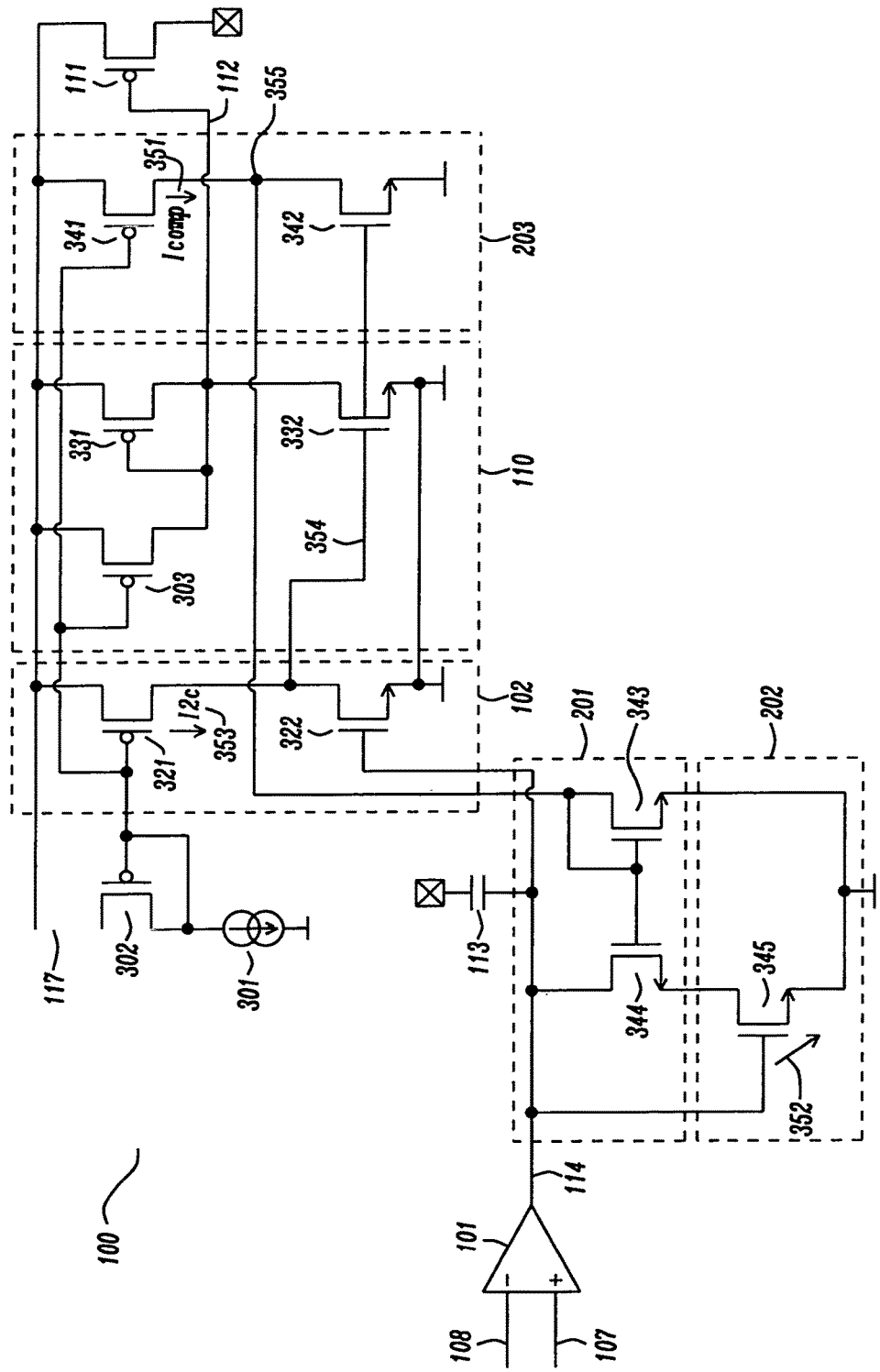
FIG. 3 shows a circuit diagram of an example LDO regulator with clamping circuitry.

FIG. 3 shows an example LDO regulator 100 with clamping circuitry 201, 202, 203. The clamping circuitry 201, 202, 203 comprises clamp control circuitry 201, 203 which is configured to detect an overvoltage condition of the output voltage 115 and which is configured to trigger a clamping unit 202 to clamp the differential output voltage 114 to a certain voltage level (referred to herein as the clamping voltage). The clamping unit 202 is depicted in FIG. 2 as a clamping diode which exhibits a diode voltage drop that corresponds to the clamping voltage.

Figure 4:
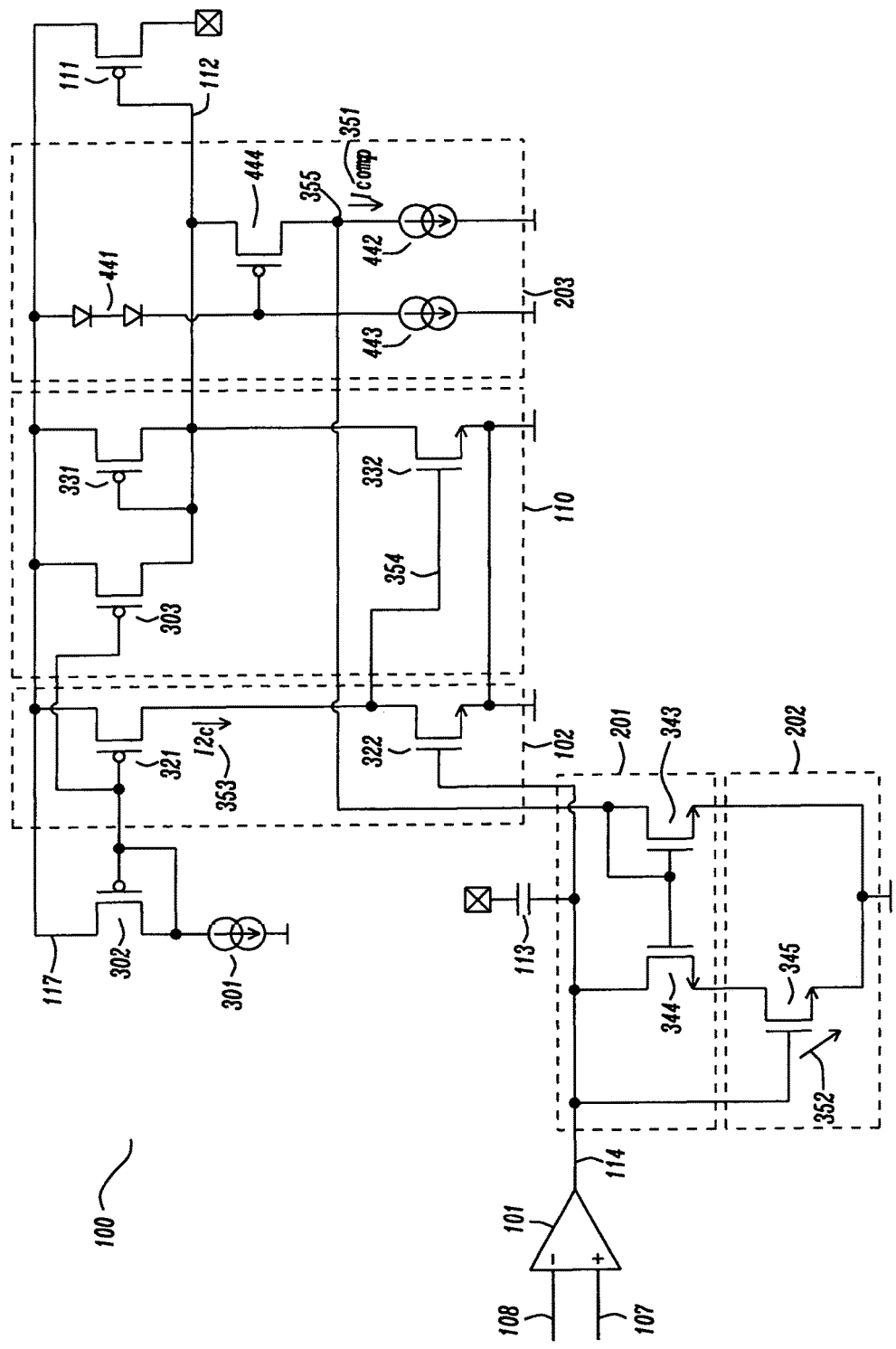
FIG. 4 shows a circuit diagram of an example LDO regulator with modified clamping circuitry.

FIG. 4 shows a circuit diagram of an example LDO regulator 100 with clamping circuitry 201, 202, 203. The second amplification stage 102 may comprise a $2^{nd}$ stage upper transistor 321 and a $2^{nd}$ stage lower transistor 322 which are arranged in series between the input voltage 117 and ground. The $2^{nd}$ stage upper transistor 321 forms a current mirror with a bias transistor 302, thereby copying a bias current from a bias current source 301 to the $2^{nd}$ stage upper transistor 321 (thereby providing the $2^{nd}$ stage comparator current, I2c 353). The differential output voltage 114 of the differential input stage 101 is applied to the gate of the $2^{nd}$ stage lower transistor 322. An increase of the differential output voltage 114 leads to an increase of the current through the $2^{nd}$ stage lower transistor 322, thereby pulling the midpoint between the $2^{nd}$ stage upper transistor 321 and the $2^{nd}$ stage lower transistor 322 down (once the current through the $2^{nd}$ stage lower transistor 322 exceeds the $2^{nd}$ stage comparator current), i.e. thereby reducing the output voltage 354 of the $2^{nd}$ stage 102.

In a similar manner, the $3^{rd}$ stage 103 comprises a $3^{rd}$ stage upper transistor 331 and a $3^{rd}$ stage lower transistor 332 which are arranged in series between the input voltage 117 and ground. The output voltage 354 of the $2^{nd}$ stage 102 is applied to the gate of the $3^{rd}$ stage lower transistor 332. A decrease of the output voltage 354 of the $2^{nd}$ stage 102 leads to an increase of the gate signal 112 which is applied to the gate of the pass transistor 111 (which comprises a p-type metaloxide semiconductor, MOS, transistor), thereby closing the pass transistor 111. The gate signal 112 may be biased using an auxiliary transistor 303.

In FIG. 3, the clamping circuitry 201, 202, 203 comprises a sensing unit 203 which is configured to sense an overvoltage condition. In particular, the sensing unit 203 is configured to detect a situation, when the pass transistor 111 is being turned off completely, due to an increase of the gate signal 112. In the illustrated example, the sensing unit 203 comprises an upper sensing transistor 341 and a lower sensing transistor 342 which are arranged in series between the input voltage 117 and ground. The output voltage 354 of the $2^{nd}$ stage 102 is applied to the gate of the lower sensing transistor 342 (as is the case for the $3^{rd}$ stage lower transistor 332). Furthermore, the upper sensing transistor 341 forms a current mirror with the bias transistor 302 as is the case for the auxiliary transistor 303 which is arranged in series with the $3^{rd}$ stage lower transistor 332 between the input voltage 117 and ground). As such, a sensing comparator current, Icomp 351 is provided at the upper sensing transistor 341, wherein the sensing comparator current 351 is compared to a current through the lower sensing transistor 342, which varies in dependence of the output voltage 354 of the $2^{nd}$ stage 102 (as is the case for the current through the $3^{rd}$ stage lower transistor 332). Hence, the voltage level at the midpoint between the upper sensing transistor 341 and the lower sensing transistor 342 (which is referred to as the sensing midpoint 355) may be used as an indication on whether the pass transistor 111 is being turned off or not.

The upper sensing transistor 341 and the auxiliary transistor 303 may be designed such that sensing comparator current 351 triggers clamping of the differential output voltage 114 prior to a time instant at which the pass transistor 111 is fully turned off. This may be achieved by selecting the upper sensing transistor 341 to have an increased width-to-length ratio (e.g. by a factor of 2) compared to the auxiliary transistor 303. The $3^{rd}$ stage lower transistor 332 and the lower sensing transistor 342 may be selected to have the same width-to-length ratio.

The clamping circuitry 201, 202, 203 further comprises a triggering unit 201 which is configured to trigger the clamping unit 202 to clamp the differential output voltage 114 to a clamping voltage, in dependence of the voltage level at the sensing midpoint 355. In the illustrated example, the triggering unit 201 comprises the first and second transistors 343, 344 which trigger the clamping transistor 352 to be on, if the voltage level at the sensing midpoint 355 above a pre-determined current threshold. As a result of this, the differential output voltage 114 is clamped to the gate-source voltage 352 of the clamping transistor 345. Otherwise, the triggering unit 201 maintains the clamping transistor 345 in off-state, such that the clamping circuitry 201, 202, 203 has no impact on the differential output voltage 114.

In other words, the circuitry, which comprises the midpoint between the upper sensing transistor 341 and the lower sensing transistor 342 (i.e. the sensing midpoint 355), the lower sensing transistor 342, the clamping transistor 345, as well as the first and second transistors 343, 344, acts like a brake mechanism, at time instants at which the differential output voltage 114 increases due to an imbalance at the input of the differential pair of the differential input stage 101. As a result of the brake mechanism, the differential output voltage 114 can only increase until the current which is sensed by the lower sensing transistor 342 reaches the current Icomp 351 through the upper sensing transistor 341, wherein Icomp is set by the bias current source 301 and the mirror ratio of the current mirror formed by the transistors 302, 341.

Once the current through the lower sensing transistor 342 reaches Icomp 351, the increase of the differential output voltage 114 is stopped. Due to the relatively high gain of this feedback loop, the accuracy of the clamping is relatively high and the clamping voltage may be set to be close to the operating point of normal operation.

In the illustrated example, the $3^{rd}$ stage 103 comprises of diode connected PMOS transistor 331 and the auxiliary transistor 303 which acts as an additional current source and which helps for biasing the $3^{rd}$ stage 103 under no load condition. Without the auxiliary transistor 303, the $3^{rd}$ stage 103 would not exhibit any current flowing under a no load condition. This might cause instability and accuracy issues under a no load condition.

In case of an overvoltage event, the differential output voltage 114 increases and the output voltage 354 of the $2^{nd}$ stage 102 decreases, thereby increasing the gate voltage 112 for the pass transistor 111, in order to ensure that no current is injected to the output of the LDO regulator 100 through the pass transistor 111. In such a situation, the only current through the $3^{rd}$ stage lower transistor 332 is due to the current provided by the auxiliary transistor 303.

However, once the output voltage 354 of the $2^{nd}$ stage 102 falls below a certain level, the current through the auxiliary transistor 303 falls below its normal operation value. The sensing comparator current Icomp 351 may be replica of the current through the auxiliary transistor 303. The upper sensing transistor 341 and the auxiliary transistor 303 may be designed such that if the current through the auxiliary transistor 303 falls below a certain level, the gates of the first and second transistors 343, 344 are high, thereby switching on the clamping transistor 344 and thereby clamping the differential output voltage 114 to the $V_{GS}$ 352 of clamping transistor 345. This clamping voltage constitutes the steady state operating point during an overvoltage situation.

As indicated above, the size of the lower sensing transistor 342 may be the same as the size of the $3^{rd}$ stage lower transistor 332. The size of the upper sensing transistor 341 may be K, with K>1, times higher than the size of the auxiliary transistor 303.

Under overvoltage condition, the current at the gate of the pass transistor 111 is close to zero. The current through the auxiliary transistor 303 and through the $3^{rd}$ stage lower transistor 332 starts going low, and the current through this branch is sensed by the lower sensing transistor 342. Once the current through the lower sensing transistor 342 starts getting less than the current through the $3^{rd}$ stage lower transistor 332, clamping may be activated. Due to a loop from the output of the differential input stage 101 to the sensing midpoint 355 (via the intermediate stage 102 and/or via the driver stage 203), and back to the output of the differential input stage 101 (via the first and second transistor 343, 344), the current through the $3^{rd}$ stage lower transistor 332 stops at the current through the upper sensing transistor 341 by not letting the differential output voltage 114 increase further. The gain of this loop influences (e.g. determines) the clamping voltage. In particular, the loop determines or sets the gate-source voltage 352 of the clamping transistor 345, thereby setting the voltage to which the output of the differential input stage 101 is clamped.

FIG. 4 shows a circuit diagram of an example LDO regulator 100 with a different type of clamping circuitry 201, 202, 203. In particular, a different type of sensing unit 203 is used for generating the overvoltage indication at a sensing midpoint 355. The sensing circuit 203 makes use of diodes 441, wherein the diode voltage drop may correspond to the threshold voltage of the pass transistor 111. The sensing unit 203 further comprises a comparator transistor 444 which is arranged in series with a current source 442 between the gate voltage 112 of the pass transistor 111 and ground. The current source 442 provides a reference or comparator current Icomp 351. The gate of the comparator transistor 444 is coupled to the midpoint between the two diodes 441 and a further current source 443.

Subject to an overvoltage situation, the gate voltage 112 increases, thereby increasing the current through the comparator transistor 444. Once this current is above Icomp 351, the sensing midpoint 355 between the comparator transistor 444 and the current source 442 goes high, and clamping is triggered. In other words, during an overvoltage event, the gate voltage 112 is increased through the regulation loop of the regulator 100 to ensure that the pass transistor 111 is off and that the output of the regulator 100 can be discharged by the load 106. Clamp control output, i.e. the gates of the first and second transistors 344, 343, is high only if the gate voltage 112 is high enough so that a current flowing through the comparator transistor 444 is higher than Icomp 351. In normal operation, when the gate voltage 112 is relatively low no current is flowing through clamp control, thereby keeping the gates of the first and second transistors 344, 343 low.

Figure 5:
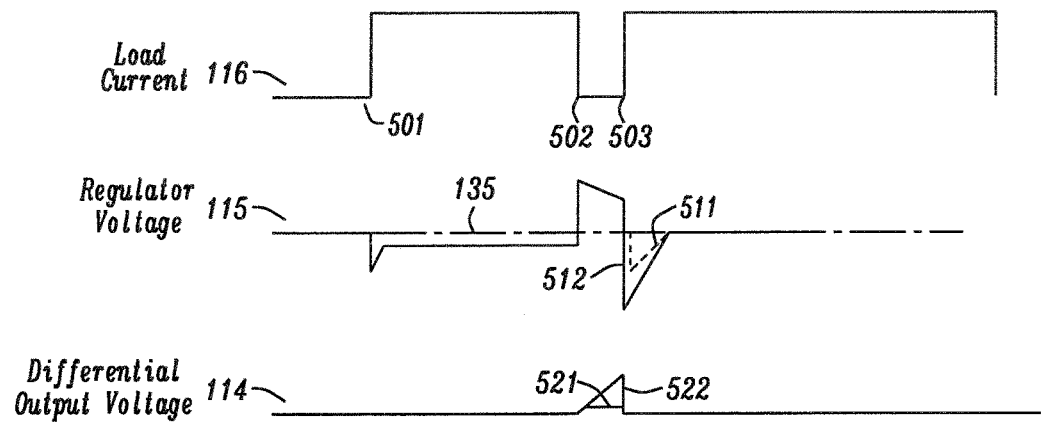
FIG. 5 shows example measurement signals at an LDO regulator with and without clamping circuitry.

FIG. 5 shows example experimental results with and without clamping. The load current exhibits an increase to IMAX at time instant 501, a decrease to 0A at time instant 502 and a re-increase to IMAX at time instant 503. In case of clamping the differential output voltage 114 is clamped (see curve 521), whereas the differential output voltage 114 increases substantially if no clamping is used (see curve 522). As a result of clamping a dip of the regulator output voltage 115 can be reduced (curve 511) compared to a case without clamping (curve 512). In other words, if the differential output voltage 114 is clamped at a value close to the normal operating point using the clamping circuitry 201, 202, 203, an output load request after an overvoltage event results in dips at the regulator output voltage 114 which are relatively small (comparable with normal operation transient load responses).

Figure 6:
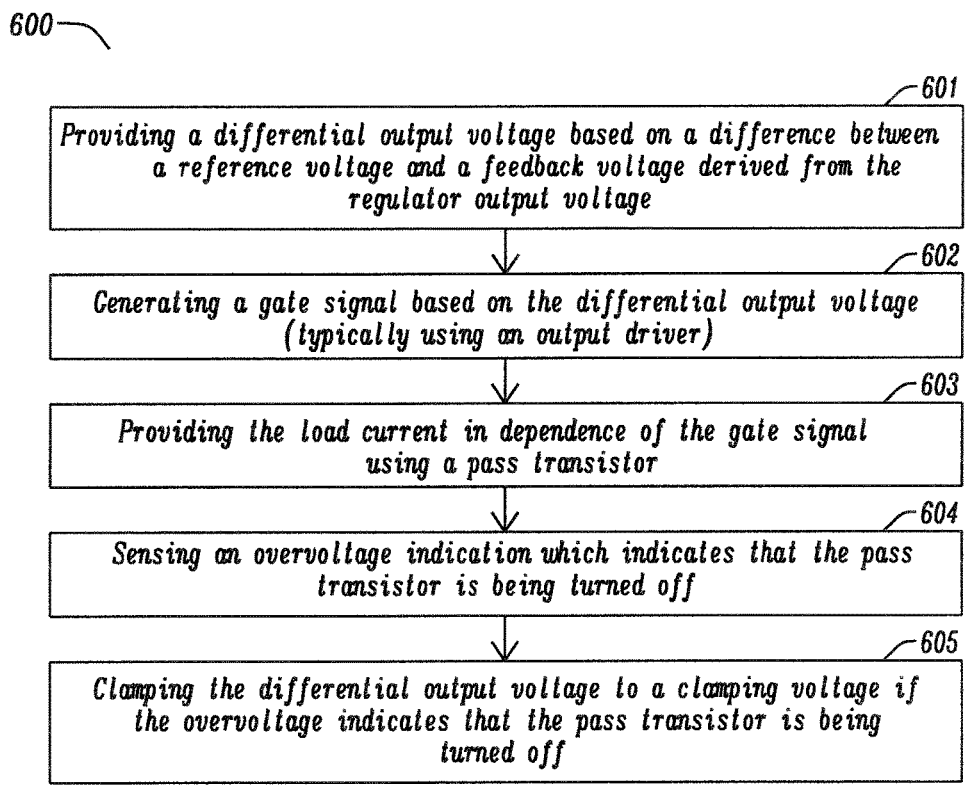
FIG. 6 shows a flow chart of an example method for reducing the recovery time of a regulator subject to an overvoltage situation.

FIG. 6 shows a flow chart of an example method 600 for providing a load current 116 at a regulator output voltage 115 to a load 106. The method 600 comprises providing 601 a differential output voltage 114 based on a difference between a reference voltage 108 and a feedback voltage 107 derived from the regulator output voltage 115. Typically the feedback voltage 107 is proportional to the regulator output voltage 115. Furthermore, the method 600 comprises generating 602 a gate signal 112 based on the differential output voltage 114 (typically using an output driver 110). In addition, the method 600 comprises providing 603 the load current 116 in dependence of the gate signal 112 using a pass transistor 111.

The method 600 further comprises sensing 604 an overvoltage indication which indicates that the pass transistor 111 is being turned off. Furthermore, the method 600 comprises clamping 605 the differential output voltage 114 to a clamping voltage 352, if the overvoltage indication indicates that the pass transistor 111 is being turned off.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A regulator for providing a load current at a regulator output voltage to a load at an output of the regulator, wherein the regulator comprises
   a differential input stage configured to provide a first intermediate voltage based on a reference voltage and based on the regulator output voltage;
   an intermediate amplification stage which is coupled to an output of the differential input stage and which is configured to generate a second intermediate voltage based on the first intermediate voltage;
   an output driver configured to generate a control signal based on the second intermediate voltage;
   a pass transistor configured to provide the load current in dependence of the control signal; and
   clamping circuitry configured to
     sense an overvoltage indication by sensing the control signal, wherein the overvoltage indication indicates that the pass transistor is being turned off; and
     clamp the first intermediate voltage to a clamping voltage, if the overvoltage indication indicates that the pass transistor is being turned off.

2. The regulator of claim 1, wherein the clamping circuitry is configured to sense the overvoltage indication by determining a mirrored version of the control signal.

3. The regulator of claim 1, wherein the pass transistor is coupled to an input voltage;
the output driver comprises an auxiliary transistor and a lower driver transistor which are arranged in series between the input voltage and ground;
the control signal is provided at a midpoint between the auxiliary transistor and the lower driver transistor, referred to as a control midpoint; and
a voltage applied to a gate of the lower driver transistor depends on the first intermediate voltage.

4. The regulator of claim 3, wherein
the output driver further comprises an upper driver transistor;
a source of the upper driver transistor is coupled to the input voltage; and
a drain and a gate of the upper driver transistor are coupled to the control midpoint.

5. The regulator of claim 3, wherein
the regulator comprises a bias current source configured to provide a bias current;
the regulator comprises a bias transistor which is arranged in series with the bias current source between the input voltage and ground; and
the auxiliary transistor and the bias transistor form a current mirror.

6. The regulator of claim 5, wherein
the clamping circuitry comprises an upper sensing transistor and a lower sensing transistor which are arranged in series between the input voltage and ground;
gates of the lower driver transistor and the lower sensing transistor are coupled to one another;
gates of the auxiliary transistor and the upper sensing transistor are coupled to one another; and
the overvoltage indication is provided at a midpoint between the upper sensing transistor and the lower sensing transistor.

7. The regulator of claim 6, wherein
a size of the upper sensing transistor is greater than a size of the auxiliary transistor; and
a size of the lower sensing transistor is equal to the size of the lower driver transistor.

8. The regulator of claim 3, wherein
the clamping circuitry comprises a comparator transistor and a reference current source which is configured to provide a reference current;
the comparator transistor and the reference current source are arranged in series between the control midpoint and ground;
a gate of the comparator transistor is coupled to an offset version of the input voltage; and
the overvoltage indication is provided at a midpoint between the comparator transistor and the reference current source.

9. The regulator of claim 8, wherein the offset version of the input voltage is generated using one of more diodes which are arranged in a forward biased manner between the input voltage and the gate of the comparator transistor.

10. The regulator of claim 1, wherein
the clamping circuitry comprises a clamping diode which is set to couple an output of the differential input stage to ground, if the overvoltage indication indicates that the pass transistor is being turned off; and
the clamping voltage depends on a diode voltage drop at the clamping diode.

11. The regulator of claim 10, wherein
the overvoltage indication takes on a low level and a high level;
the clamping diode comprises a clamping transistor;
a gate of the clamping transistor is coupled to the output of the differential input stage;
a source of the clamping transistor is coupled to ground;
the clamping circuitry is configured to couple or decouple a drain of the clamping transistor to or from the gate of the clamping transistor in dependence of the level of the overvoltage indication.

12. The regulator of claim 11, wherein
the clamping circuitry comprises a first transistor and a second transistor;
a drain of the first transistor is coupled to a node at which the overvoltage indication is provided;
a drain of the second transistor is coupled to the output of the differential input stage;
gates of the first transistor and the second transistor are coupled to one another;
the gate of the first transistor is coupled to the drain of the first transistor;
a source of the first transistor is coupled to ground; and
a source of the second transistor is coupled to the drain of the clamping transistor.

13. The regulator of claim 1, wherein the differential input stage is configured to provide the first intermediate voltage based on a difference between the reference voltage and a feedback voltage derived from the regulator output voltage.

14. A method for providing a load current at a regulator output voltage to a load, wherein the method comprises the steps of:
providing a first intermediate voltage based on a difference between a reference voltage and a feedback voltage derived from the regulator output voltage using a differential input stage;
providing a second intermediate voltage based on the first intermediate voltage using an intermediate amplification stage which is coupled to an output of the differential input stage.
generating a control signal based on the second intermediate voltage;
providing the load current in dependence of the control signal using a pass transistor;
sensing an overvoltage indication by sensing the control signal, wherein the overvoltage indication indicates that the pass transistor is being turned off; and
clamping the first intermediate voltage to a clamping voltage, if the overvoltage indication indicates that the pass transistor is being turned off.

15. A method for providing a regulator for providing a load current at a regulator output voltage to a load at an output of the regulator, wherein the regulator comprises the steps of:
providing a differential input stage to provide a first intermediate voltage based on a reference voltage and based on the regulator output voltage;
providing an intermediate amplification stage which is coupled to an output of the differential input stage and which is configured to generate a second intermediate voltage based on the first intermediate voltage;
providing an output driver to generate a control signal based on the second intermediate voltage;
providing a pass transistor to provide the load current in dependence of the control signal; and providing clamping circuitry to
  sense an overvoltage indication by sensing the control signal, wherein the overvoltage indication indicates that the pass transistor is being turned off; and
  clamp the first intermediate voltage to a clamping voltage, if the overvoltage indication indicates that the pass transistor is being turned off.

16. The method of claim 15, further comprising the step of:
  sensing by the clamping circuitry the overvoltage by determining a mirrored version of the control signal.

17. The method of claim 15, wherein
  the pass transistor is coupled to an input voltage;
  the output driver comprises an auxiliary transistor and a lower driver transistor which are arranged in series between the input voltage and ground;
  the control signal is provided at a midpoint between the auxiliary transistor and the lower driver transistor, referred to as a control midpoint; and
  a voltage applied to a gate of the lower driver transistor depends on the first intermediate voltage.

18. The method of claim 17, wherein
  the output driver further comprises an upper driver transistor;
  a source of the upper driver transistor is coupled to the input voltage; and
  a drain and a gate of the upper driver transistor are coupled to the control midpoint.

19. The method of claim 17, wherein
  the regulator comprises a bias current source to provide a bias current;
  the regulator comprises a bias transistor which is arranged in series with the bias current source between the input voltage and ground; and
  the auxiliary transistor and the bias transistor form a current mirror.

20. The method of claim 19, wherein
  the clamping circuitry comprises an upper sensing transistor and a lower sensing transistor which are arranged in series between the input voltage and ground;
  gates of the lower driver transistor and the lower sensing transistor are coupled to one another;
  gates of the auxiliary transistor and the upper sensing transistor are coupled to one another; and
  the overvoltage indication is provided at a midpoint between the upper sensing transistor and the lower sensing transistor.

21. The method of claim 20, wherein
  a size of the upper sensing transistor is greater than a size of the auxiliary transistor; and
  a size of the lower sensing transistor is equal to the size of the lower driver transistor.

22. The method of claim 17, wherein
  the clamping circuitry comprises a comparator transistor and a reference current source to provide a reference current;
  the comparator transistor and the reference current source are arranged in series between the control midpoint and ground;
  a gate of the comparator transistor is coupled to an offset version of the input voltage; and
  the overvoltage indication is provided at a midpoint between the comparator transistor and the reference current source.

23. The method of claim 22, wherein the offset version of the input voltage is generated using one of more diodes which are arranged in a forward biased manner between the input voltage and the gate of the comparator transistor.

24. The method of claim 15, wherein
  the clamping circuitry comprises a clamping diode which is set to couple an output of the differential input stage to ground, if the overvoltage indication indicates that the pass transistor is being turned off; and
  the clamping voltage depends on a diode voltage drop at the clamping diode.

25. The method of claim 24, wherein
  the overvoltage indication takes on a low level and a high level;
  the clamping diode comprises a clamping transistor;
  a gate of the clamping transistor is coupled to the output of the differential input stage;
  a source of the clamping transistor is coupled to ground;
  the clamping circuitry to couple or decouple a drain of the clamping transistor to or from the gate of the clamping transistor in dependence of the level of the overvoltage indication.

26. The method of claim 25, wherein
  the clamping circuitry comprises a first transistor and a second transistor;
  a drain of the first transistor is coupled to a node at which the overvoltage indication is provided;
  a drain of the second transistor is coupled to the output of the differential input stage;
  gates of the first transistor and the second transistor are coupled to one another;
  the gate of the first transistor is coupled to the drain of the first transistor;
  a source of the first transistor is coupled to ground; and
  a source of the second transistor is coupled to the drain of the clamping transistor.

27. The method of claim 16, wherein the differential input stage provides the first intermediate voltage based on a difference between the reference voltage and a feedback voltage derived from the regulator output voltage.

* * * * *